March 15, 1960
R. B. BEARD
2,928,276
MEANS FOR MEASURING THERMOELECTRICALLY
A CONSTITUENT OF AN ATMOSPHERE
Filed Oct. 30, 1953
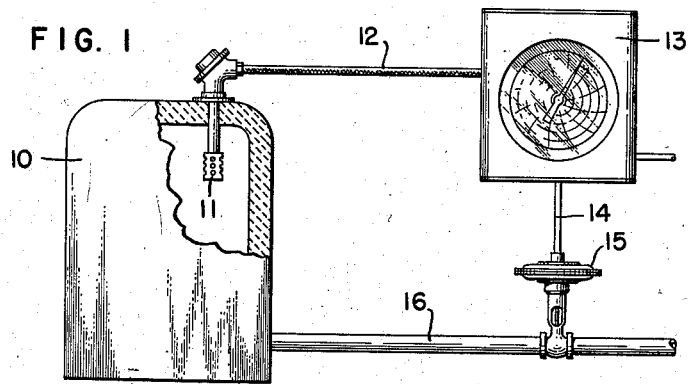
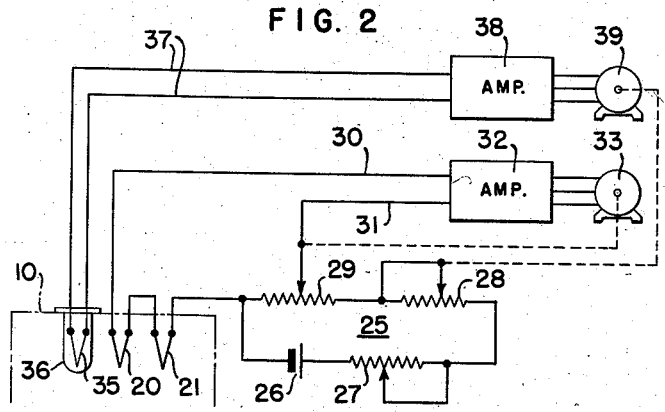
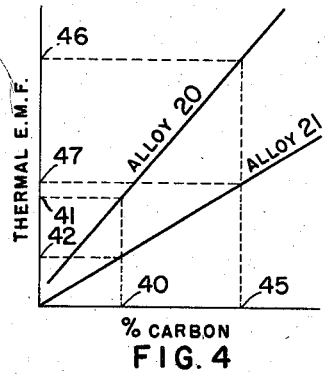
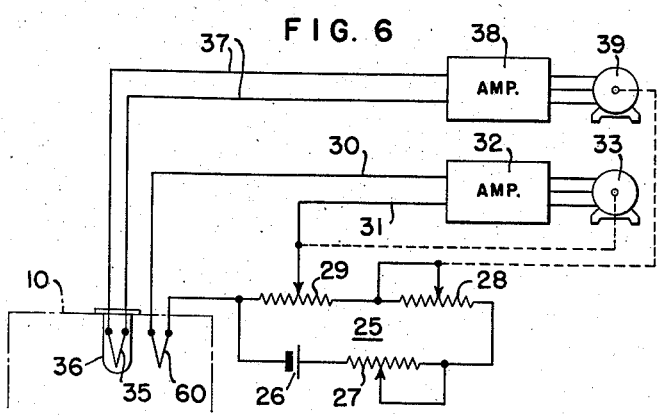
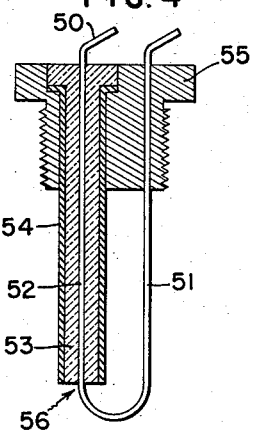
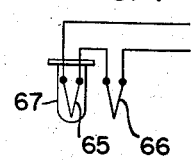
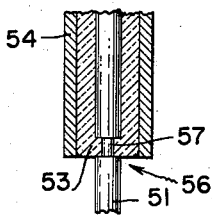
*INVENTOR.*
RICHARD B. BEARD
BY
*ATTORNEY.*

2,928,276
Patented Mar. 15, 1960

2,928,276

MEANS FOR MEASURING THERMOELECTRICALLY A CONSTITUENT OF AN ATMOSPHERE

Richard B. Beard, Philadelphia, Pa., assignor to Minneapolis-Honeywell Regulator Company, Minneapolis, Minn., a corporation of Delaware Application October 30, 1953, Serial No. 389,418

12 Claims. (Cl. 73—23)

The present application is a continuation in part of application Serial No. 364,760, filed June 29, 1953, and entitled "Measuring Apparatus," now abandoned.

A general objects of the present invention is to provide a new and improved apparatus for determining the amount of a constituent in an atmosphere. More specifically, the present invention is concerned with an atmosphere constituent measuring apparatus which is characterized by its ability accurately to follow constituent changes of an atmosphere, and by its relatively long life.

Metal heat treating furnaces are widely used today for forming special surfaces on metals. One of the most widely heat treated metals is iron and its various alloys with the treated metal generally having carbon absorbed in the surface of the metal. The heat treating operation is generally carried out in a special heat treating atmosphere and, in the case of iron and its alloys, this atmosphere is generally referred to as a carburizing atmosphere. The ability of a carburizing atmosphere to deposit carbon on the surface of the metal is frequently referred to as the carbon potential of the atmosphere. If the carbon potential of the atmosphere is higher than that of the metal being treated, carbon will be transferred from the atmosphere into the metal. Conversely, if the carbon potential is lower than that of the metal, carbon will be transferred from the metal into the atmosphere.

One of the important factors to know in controlling a heat treating atmosphere is what is taking place in the metal being heat treated. One method of determining the carbon potential and its effect upon the metal is to observe the resistance change of a sample which is exposed to the atmosphere with the resistance change being an indication of the carbon potential of the atmosphere. A straight resistance element has many shortcomings with the principal one being that the sensing element is subject to rapid deterioration due to oxidation and other corrosive action of the heat treating atmosphere with the result that the resistance measurement of a given element will not be consistent over long periods of time.

In accordance with the present invention, the carbon potential of a furnace atmosphere is determined by the thermoelectric potential change occurring at a thermal junction when the materials of the junction are exposed to the constituent of the atmosphere being measured. The amount of sorbed gas in a metal is a function of the carbon in the metal. Further, the quantity of absorbed gas in a metal determines the E.M.F. which this metal will generate when placed against another dissimilar metal. Thus, the output of a thermocouple in a heat treating atmosphere is a function of the carbon potential of the atmosphere.

Further, it is frequently desirable to know the amount of certain other constituents in a heat treating atmosphere, or other atmosphere. Such other constituents may be, for example, hydrogen or nitrogen. As with the carbon potential measurement, certain thermocouples may be arranged to be selectively sensitive to other atmosphere constituents and provide signals useful in the examination or the control of the atmosphere under examination.

It is accordingly a more specific object of the present invention to provide an improved atmosphere constituent measuring apparatus in the form of a thermoelectric junction which will detect a constituent of the atmosphere.

A further more specific object of the present invention is to provide an improved constituent measuring apparatus for an atmosphere employing a pair of thermoelectric elements whose thermal junctions will vary in accordance with the amount of the constituent in the atmosphere.

Still another more specific object of the present invention is to provide an improved constituent measuring apparatus for an atmosphere wherein the element comprises a wire element having a portion thereof shielded from the atmosphere with the other portion exposed to a constituent of the atmosphere and producing a thermal junction whose potential varies in accordance with the amount of the constituent present in the atmosphere.

A still more specific object of the present invention is the provision of a thermoelectric constituent sensing apparatus wherein the thermoelectric element of the apparatus is compensated for temperature changes of the atmosphere under examination.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Fig. 1 represents a diagrammatic showing of a system which may incorporate apparatus of the type of the present invention;

Fig. 2 is a diagrammatic showing of an electrical circuit incorporating the present invention;

Fig. 3 is a graphical representation of the operation of the sensing elements shown in Fig. 2;

Fig. 4 shows one manner in which a thermoelectric element may be formed;

Fig. 5 shows an enlarged detail of a portion of the apparatus of Fig. 4;

Fig. 6 shows a modified circuit incorporating a single sensing element; and

Fig. 7 shows a modified temperature compensated circuit.

Referring first to Fig. 1, the numeral 10 represents a furnace which may be of the heat treating type wherein the atmosphere contains a constituent which it is desired to transfer to a work piece within the furnace. A constituent potential sensing unit 11 projects inside the furnace so as to be exposed to the atmosphere of the furnace. The sensing unit 11 is connected by leads 12 to a suitable indicating and recording instrument 13. This instrument will be effective to respond to the electrical signals on the leads 12 and produce an appropriate indicating and recording operation. This instrument may well take the form of the apparatus disclosed in the patent of Walter P. Wills, No. 2,423,540, issued July 8, 1947. This instrument 13 may likewise produce an output control pressure which is proportional to the electrical signals on the input leads 12. This output pressure may be fed through a conduit 14 to a suitable pneumatic control valve 15. The valve 15 is in turn used to control the flow of an enriching gas into the furnace 10 which is conducted thereto by way of a conduit 16. It will thus be seen that the apparatus shown in Fig. 1 may comprise a control system which is effective to maintain a desired condition within the furnace 10 with the indicator and controller 13 providing a control action which will be effective to regulate the valve 15 and maintain the condition within the furnace at the desired value.

Referring now to Fig. 2, this figure represents one form of the electrical circuit that may be used in the apparatus of Fig. 1. Here, a pair of thermoelectric elements 20 and 21 are arranged for positioning within the furnace 10 so as to be directly exposed to the atmosphere of the furnace. Each of these thermocouples comprises materials which will sorb the constituent which is being used to react with the metal treated within the furnace 10. For carburizing, these thermocouple elements are generally of the ferrous alloy type since iron and its alloys will readily combine with carbon. By selecting the materials of the thermocouples 20 and 21 to be of a different type, it is possible to have a thermoelectric characteristic in the one couple which is different from that of the other. Inasmuch as the elements of the thermocouples will sorb the constituent of the gas atmosphere being observed, the thermal junction potential of each of the thermocouples will change.

Referring to Fig. 3, there is a plot of thermal E.M.F. against percent carbon. It will be noted that the slope of the line representing the thermal E.M.F. versus carbon content for alloy 20 is steeper than the slope of the corresponding curve for alloy 21.

The thermoelectric elements 20 and 21 are differentially connected together to a potentiometric network 25 which comprises a source of potential 26, an adjustable resistor 27, a temperature compensating resistor 28, and an adjustable slidewire potentiometer 29. The electrical output of the network 25 on the thermocouples 20 and 21 appears on leads 30 and 31 on the input of an amplifier 32. The amplifier 32 is arranged to reversibly drive a motor 33 which is connected to have its output adjust the rebalancing slidewire potentiometer 29.

In the event that the temperature of the furnace 10 is not maintained absolutely constant, it is necessary that some temperature compensation be incorporated in the apparatus. This temperature compensation may be accomplished by a further thermoelectric element 35 which is arranged to be positioned within the furnace 10. This thermoelectric element is shielded from the atmosphere by a shield 36 which protects the metal from the atmosphere and yet allows the thermal junction thereof to assume the temperature of the atmosphere within the furnace. A pair of output leads 37 serve to connect the thermocouple 35 to an amplifier 38. The amplifier 38 is in turn effective to reversibly drive a motor 39 which motor may be arranged to variably adjust the compensating resistor 28 in the network 25.

In considering the operation of the electrical circuit of Fig. 2, reference should first be had to the graph in Fig. 3. Let it first be assumed that the point 40 represents the percent carbon or other constituent to be measured present in the atmosphere within the furnace 10. It is further assumed that the elements 20 and 21 have come to an equilibrium point with respect to that percent carbon. The thermal E.M.F. for the element 20 will be represented by the point 41 on the graph while the thermal E.M.F. of the element 21 will be represented by the point 42. Since the thermocouple elements 20 and 21 are differentially connected, the net output voltage from the thermocouples will be the difference between the points 41 and 42. This difference will be applied to the input of the amplifier 32 by way of leads 30 and 31 and the amplifier will drive the motor 33 to position the slider of the slidewire potentiometer 29 to a position where the potential of the slider will be exactly equal to, and opposite, the potential difference originating from the thermocouple elements 20 and 21.

Since the slopes of the characteristics of the two elements 20 and 21 is different, as viewed in Fig. 3, it will be seen that if the percent carbon changes, the thermal E.M.F. difference between the two thermocouples will likewise change. In other words, if the percent carbon should shift so that it is now represented by the point 45, the thermal E.M.F. of the element 20 will be represented by the point 46 and the thermal E.M.F. for the element 21 will be represented by the point 47. It will be noted that this thermal E.M.F. difference is greater than the thermal E.M.F. difference that existed when the carbon was represented by the point 40. With this new larger potential difference existing on the outputs of the thermocouples 20 and 21, there will be a further adjustment of the slider of the potentiometer slidewire 29 with the new position of the slider being indicative of the percent carbon in the thermal junctions or the carbon potential of the atmosphere in the furnace 10.

Inasmuch as the temperature within the furnace 10 may vary, it will be obvious that such variation will produce a change in the electrical output of the thermocouple elements 20 and 21. As it is desired that these elements indicate only the percent carbon or the carbon potential of the atmosphere, effective temperature changes may be compensated by the presence of the thermocouple element 35 which will be effective by way of the amplifier 38 and motor 39 to adjust the temperature compensating resistor 28 and eliminate potential changes resulting from temperature changes of the atmosphere. While a specific form of temperature compensation has been shown, it will be obvious that other forms of temperature compensation may be satisfactory so long as that compensation is effective to eliminate the effect of potential changes in the thermocouples 20 and 21 resulting from atmospheric temperature changes.

Referring to Fig. 4, there is shown here one form that a thermal junction used in the apparatus may assume. In this configuration, a single wire element 50 is arranged so as to be partially exposed to the atmosphere within the furnace. The exposed portion is identified by the numeral 51 with the unexposed portion 52 being protected by a non-porous sealing material 53, such as high temperature glass. Surrounding the sealing material 53 is a protecting metallic sleeve 54. This assembly is in turn mounted in a suitable threaded plug 55 so as to be adapted for ready removal in the event that replacement is required.

If the wire element 50 has the same composition in the sealed section 52 and the unsealed section 51, such as pure iron, there will be no thermal E.M.F. appearing on the output of the element so long as the iron remains pure. However, if the exposed section 51 sorbs the constituent from the furnace atmosphere, there will be a thermoelectric junction formed at point 56. This junction will form at this point because the portion 51 is now of a different material and has more gas sorbed therein than that of the portion 52 with the result that a thermal E.M.F. will be formed at their junction point.

Referring to Fig. 5, there is shown in detail the thermal junction of Fig. 4. It will here be seen that at the junction 56 between the sections 51 and 52 that the element has been reduced in cross section with the sealing element 53 projecting into the reduced cross section 57. By reducing the cross section in this manner, it is possible to minimize the effect of carbon and gases being sorbed in the portion 52 which is under the sealing element 53.

One of the thermoelectric elements used in the apparatus of Fig. 2 may be of the type shown in Fig. 4. Further, the thermoelectric element of the type shown in Fig. 4 may be used as shown in the apparatus of Fig. 6. The thermoelectric potential change with percent carbon change may correspond to the line representing the element 21 of Fig. 3 so that in either circuit, the change in the output potential will be indicative of the percent carbon sorbed by the element.

Referring specifically to Fig. 6, a single thermoelectric element 60 is shown. The output of this element is connected to a potentiometric network of the type shown in Fig. 2 with corresponding components carrying corresponding reference numerals.

The functioning of the apparatus of Fig. 6 is essentially the same as that of Fig. 2 with the exception that the potential of a single thermoelectric element is being balanced by the potentiometric network 25.

As with the circuit shown in Fig. 2, the circuit of Fig. 6 must also be temperature compensated if the temperature within the furnace 10 is not maintained constant. This may be accomplished by a network of the type corresponding to that shown in Fig. 2 or by any other suitable temperature compensating network. It will be noted that at 0% carbon, an element of the type shown in Fig. 4 will have little or no output voltage. Thus, the temperature compensation must be arranged so as not to produce an error or false signal. The circuit of Fig. 6 is free from this deficiency.

The apparatus of Fig. 2 may be modified as shown in Fig. 7 with the elements 20 and 21 being replaced by a pair of similar elements 65 and 66. Here, the element 65 is shielded from the atmosphere by a suitable shielding 67. If the elements 65 and 66 are identical in their basic formation and the elements are differentially connected, it is possible for this configuration to be self-compensating for temperature changes in the atmosphere. In this manner, the only potential change which will be indicated on the output leads of the two thermocouples will be changes due to the carbon potential of the furnace atmosphere. A circuit such as the one shown in Fig. 7 may be used where it is not necessary to isolate the temperature compensating thermocouple from the carbon potential sensing thermocouple or where the thermocouple sensitive only to furnace temperature is not needed to separately provide a signal for maintaining the temperature of the furnace constant.

When the constituent within the atmosphere to be examined is some other gas, such as hydrogen, the thermocouples used should be those formed of metals having a high selective sorption for the hydrogen gas. Two metals particularly adapted for this type of sensing are platinum and palladium. Their adaptability is partially dependent on their ability to withstand high temperature present in many atmospheres. A particularly sensitive hydrogen sensing thermocouple is a platinum-platinum plus 10%–13% rhodium. Another suitable couple is a platinum-palladium couple. Obviously, a single platinum or palladium wire may be used in apparatus of the type shown in Figs. 4 and 5 with the exposed portion of the wire forming a junction with the unexposed portion and with the E.M.F. of that junction being proportional to the hydrogen sorbed by the wire at the junction.

When nitrogen in an atmosphere is to be measured, the sensing thermocouple may well be formed of elements including tantalum which is very sensitive to the presence of nitrogen. Thus, a suitable nitrogen sensing couple may be a nickel-nickel plus tantalum impurity. If there is an appreciable amount of hydrogen present, it may be necessary to compensate for this by a suitable hydrogen sensing couple, as of the type explained above. Thus, should the circuit configuration of Fig. 2 be used, the thermocouple 20 may be the nitrogen sensing element and the thermocouple 21 may be the hydrogen compensating element.

It will be readily apparent that in both the hydrogen and nitrogen sensing forms of the apparatus, the circuit configurations of Figs. 2 through 7 may be adapted depending upon the particular problem at hand.

While, in accordance with the provisions of the statutes, there has been illustrated and described preferred embodiments of the invention, those skilled in the art will understand that changes may be made in the form of the apparatus disclosed without departing from the spirit of the invention as set forth in the appended claims, and that some features of the present invention may be used to advantage without a corresponding use of other features.

Having now described my invention, what I claim as new and desire to secure by Letters Patent is:

1. In apparatus for measuring a constituent potential of a heated atmosphere, the combination comprising, a pair of dissimilar thermocouples arranged to be directly exposed to the atmosphere, each of said thermocouples being formed of materials which will sorb the constituent of the atmosphere and therefore proportionally change the output potential of the thermocouple, means differentially connecting said thermocouples to a potentiometric network, balance sensing means connected to said network and thermocouples for adjusting said network to a balance so as to indicate by the balance point the constituent potential of the atmosphere, and means responsive to the temperature of the atmosphere connected to said potentiometric network to compensate for potential changes in said thermocouples due to atmosphere temperature change.

2. An atmosphere constituent potential measuring apparatus comprising, a wire element which is capable of sorbing the constituent of the gas, a non-porous sealing element covering a portion of said wire element to divide said wire element into two parts with the junction thereof having a thermal E.M.F. upon being heated to a temperature different from the temperature of other portions of said wire element and when the unshielded portion of the wire has sorbed the constituent, means for measuring the E.M.F. of said junction, and temperature compensating means connected to said last named means arranged so that when there is no E.M.F. from said junction, said compensating means will be ineffective.

3. In apparatus for observing the amount of a constituent in the atmosphere of a heat treating furnace, the combination comprising, a first and a second metallic portion each having different, predetermined sorption characteristics for the constituent, said two portions being connected together and forming a thermoelectric junction whose output potential varies with the amount of a constituent of the atmosphere that is sorbed by a least one of said metallic portions at the junction, means for positioning said thermoelectric junction in the furnace so as to be directly exposed to the temperature therein and to the atmosphere therein, potential measuring means connected to said thermoelectric junction to indicate the magnitude of the constituent of the atmosphere, and furnace temperature compensating means connected to said measuring means to eliminate the effect of potential changes in said thermoelectric junction due to changes in the temperature of the furnace atmosphere.

4. Means for analyzing a heated gas, including, a single wire element formed of a metallic substance capable of sorbing a constituent of the gas, said wire element having a section of reduced cross-sectional area, and a non-porous sealing element interposed between a portion of said wire element including the section of said wire element of reduced cross-sectional area to divide said wire element into two parts, the junction of said two parts having a thermal potential in proportion to the amount of the constituent sorbed by the unsealed portion of said wire element when said junction is heated and when the unsealed portion of said wire element has sorbed the constituent, said junction being formed at the section of reduced cross-sectional area to impede the sorption of the constituent into the sealed portion of the wire element.

5. Apparatus as defined in claim 4 wherein said wire element is iron.

6. Apparatus for measuring the carbon potential of a heated atmosphere, including, a wire of ferrous metallic material capable of sorbing a constituent of said atmosphere, and a non-porous sealing element covering a portion of said wire and interposed between said wire and said atmosphere and dividing said wire into two parts, said wire having a thermal E.M.F. which varies with the amount of the constituent sorbed by the unshielded portion of the wire when the junction of said two parts is heated to a temperature different from the temperature of portions of said wire remote from the junction.

7. Apparatus as defined in claim 3 wherein said furnace temperature compensating means is connected to said measuring means in series with said thermoelectric junction.

8. Apparatus as defined in claim 3, including a third and a fourth metallic portion each having different, predetermined sorption characteristics for the constituent, said third and fourth portions being connected together and forming a second thermoelectric junction whose output potential varies with the amount of a constituent of the atmosphere that is sorbed by at least one of said metallic portions at said second junction, and means for positioning said second thermoelectric junction in the furnace so as to be directly exposed to the temperature therein and to the atmosphere therein, said first and second thermoelectric junctions being connected in series with each other and with said potential measuring means.

9. Apparatus as defined in claim 8 wherein said first and said second thermoelectric junctions are connected differentially so that the output potential of one is of opposite polarity to the output potential of the other.

10. Apparatus as defined in claim 2 wherein said temperature compensating means is connected to said means for measuring the E.M.F. of said junction in series with said junction.

11. Apparatus as defined in claim 2, including a second wire element which is capable of sorbing the constituent of the gas, a second non-porous sealing element covering a portion of said second wire element to divide said second wire element into two parts with the junction thereof having a thermal E.M.F. upon being heated to a temperature different from the temperature of other portions of said second wire element and when the unshielded portion of said second wire element has sorbed the constituent, said first and second junctions being connected in series with each other and with said means for measuring the E.M.F. of said junction.

12. Apparatus as defined in claim 11 wherein said first and second junctions are connected differentially so that the E.M.F. of one junction is of opposite polarity to the E.M.F. of the other junction.

References Cited in the file of this patent

UNITED STATES PATENTS

| | | |
|---|---|---|
| 1,559,461 | Ruben | Oct. 27, 1925 |
| 1,860,541 | Hebler | May 31, 1932 |
| 1,957,341 | Holt | May 1, 1934 |
| 2,010,995 | Jacobson | Aug. 13, 1935 |
| 2,079,601 | Canfield | May 11, 1937 |
| 2,083,521 | Miller | June 8, 1937 |
| 2,084,992 | Claypoole | June 29, 1937 |
| 2,149,441 | Jacobson | Mar. 7, 1939 |
| 2,218,622 | Robezzana | Oct. 22, 1940 |
| 2,276,218 | Lemmens | Mar. 10, 1942 |
| 2,279,231 | Gier | Apr. 7, 1942 |
| 2,279,397 | Harltine | Apr. 14, 1942 |
| 2,423,540 | Wills | July 8, 1947 |
| 2,459,618 | Cartier | Jan. 18, 1949 |
| 2,541,857 | Besselman et al. | Feb. 13, 1951 |
| 2,698,352 | Fagg et al. | Dec. 28, 1954 |

FOREIGN PATENTS

| | | |
|---|---|---|
| 23,424 | Great Britain | Dec. 5, 1893 |

OTHER REFERENCES

Metal Reference book, Smithells, text, 1949, pages 377, 378.